Aug. 1, 1944.    E. ROBEY    2,354,834

SPRING ASSEMBLY

Filed Nov. 14, 1942

INVENTOR.
Edward Robey,
BY
Robert M. Fulwider
ATTORNEY.

Patented Aug. 1, 1944

2,354,834

UNITED STATES PATENT OFFICE 2,354,834

SPRING ASSEMBLY

Edward Robey, Los Angeles, Calif.

Application November 14, 1942, Serial No. 465,531

7 Claims. (Cl. 5—255)

My invention relates generally to spring assemblies for use in mattresses, box springs, overstuffed furniture, and the like, and particularly to springs using wood instead of metal.

For many years, practically all furniture springs have been made of metal, but with the present shortage of metal, it has become necessary to turn to other materials, such as wood, for example, which call for the application of an entirely new technique in the making of springs and assembling them in articles of furniture. While the resilience of certain kinds of wood has been used in the past in the art of making springs, none of the prior devices were sufficiently satisfactory to successfully compete with metal springs, and it is consequently one of the major objects of my invention to provide a non-metallic spring assembly which is not only timely, due to the shortage of metal, but which can successfully compete with metal springs in a given price-quality range.

It is also an object of my invention to provide a spring assembly which can be made of wood or other non-metallic resilient material at a relatively low cost and with a minimum of equipment.

A further object of my invention is to provide individual spring units which are readily interchangeable and not subject to failure.

Another object of my invention is the production of multiple spring units which can be assembled in various ways to meet particular requirements.

A still further object of my invention is to provide a non-metallic spring unit which can be flexed when assembled in an article of furniture without frictional wear on the covering cloth, and without danger of failure.

Figure 1:
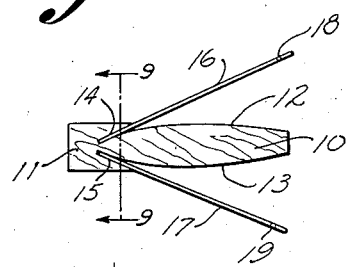
Figure 3:
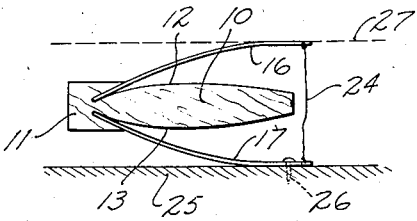
Figure 2:
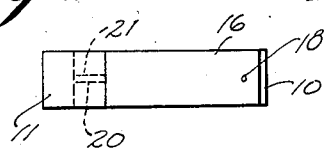
Figure 4:
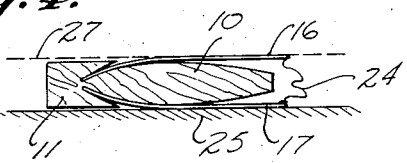
Figure 5:
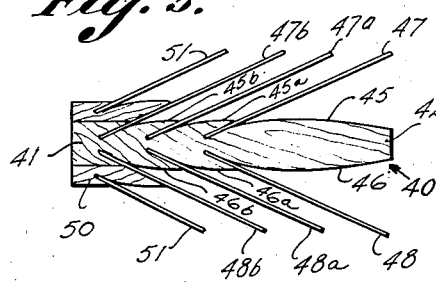
Figure 7:
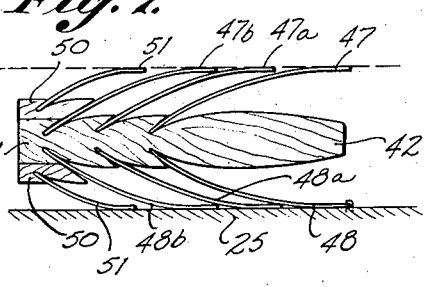
Figure 6:
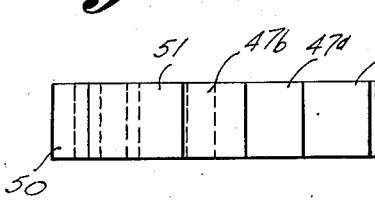

These and other objects and advantages of my invention will become apparent from the following description of a preferred form thereof, and from a consideration of the attached drawing, in which:

Fig. 1 is a side elevation of a single unit spring assembly in unflexed condition, Fig. 2 is a top plan view of the unflexed assembly of Fig. 1, Fig. 3 is a side elevation of the spring assembly of Fig. 1 in partially flexed condition mounted on a base board in an article of furniture, Fig. 4 is a side elevation of the spring of Fig. 3 in substantially fully flexed condition, Fig. 5 is a side elevation of a plural unit spring assembly in unflexed condition, Fig. 6 is a top plan view of the spring shown in Fig. 5, Fig. 7 is a side elevation of the plural spring of Fig. 5 in partially flexed condition.

Figure 8:
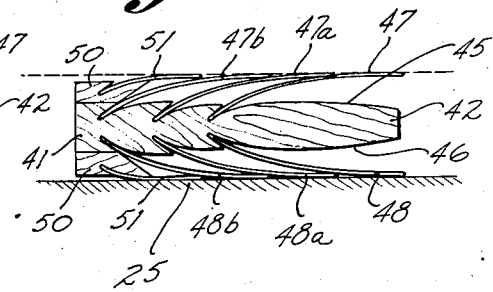
Figure 9:
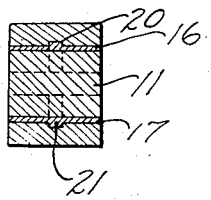

Fig. 8 is a side elevation of the spring assembly of Fig. 7 in fully flexed condition, and Fig. 9 is a vertical cross-section taken on the line 9—9 of Fig. 1.

Referring now to Figs. 1 to 4, the spring assembly of my invention includes a longitudinal supporting block which I will hereinafter refer to as a spinal member or spine, and which comprises a butt end 11 and a seat portion 10 preferably ellipsoidal in shape and having upper and lower faces 12 and 13, respectively. The spinal member is provided with a pair of angular transverse slots 14 and 15 where the upper and lower faces 12 and 13, respectively, terminate in the butt 11, these slots preferably extending clear across the spine. A flexible leaf 16, preferably made of birchwood or other suitable material and of substantially the same width as the spinal member, is inserted in the slot 14 and extends angularly over the face 12 in spaced relation thereto, to a point adjacent the end thereof. A similar flexible leaf 17 is seated in the groove 15 and extends angularly under and spaced from the lower face 13 of the spinal member. The outer ends of the leaves 16 and 17 may be provided with holes 18 and 19, respectively, to permit the ends of the strips to be tied together in a partially stressed position such as shown in Fig. 3.

If desired, the leaf 16 may be provided with a centrally disposed ridge or key 21 (seen best in Fig. 9) adapted to slide into a complemental groove or keyway 20 in the upper face of the slot 14 in butt 11. Leaf 17 may be provided with a similar key 23 fitting into a complemental keyway 22. Said keys prevent the leaves 16 and 17 from moving laterally in their respective slots, and therefore minimize the strain on the glue with which the ends of the leaves 16 and 17 are preferably coated prior to insertion in the slots 14 and 15.

In using the spring assembly of my invention, it is preferably mounted on a relatively rigid base board or back board 25 in partially stressed or flexed condition as seen in Fig. 3. A convenient way to stress the spring is to tie the outer ends of the leaves 16 and 17 together with a string 24 so that their outer portions are substantially parallel to each other. One of the leaves, 17 in Fig. 3, is then mounted on the base board 25 in suitable manner, and if it is desired to fasten it to the base board, means such as a nail or tack 26 may be used. In this position, the spinal member floats between the base board 25 and a covering strip 27, and is free to move in a vertical path and also horizontally as the leaves 16 and 17 are compressed. By this means the outer ends of the leaves move in a true vertical path when compressed and eliminate frictional wear on the covering, and the net increase in length of the unit is taken up by horizontal movement of the spine which will move to the left when the spring is compressed to the position shown in Fig. 4.

When a weight or other force is applied to the top of the spring assembly, the spring unit will be depressed downwardly, causing flexing of both the upper leaf 16 and the lower leaf 17. The curved portion 10 of the spine acts as a support and safety stop for the leaves 16 and 17 and the curvature of the faces 12 and 13 of the spine is approximately that which the leaves assume under full stressed condition, so that when they have been compressed to the allowable point they will rest on the supporting faces 12 and 13 and be in engagement therewith, throughout most of their length, thus eliminating the possibility of the leaves being broken by over-stressing. The angle assumed by the leaves under stressed condition will of course depend somewhat upon the material used, the dimensions of the leaves, and the exact point of application of the force. However, with suitable care these curves can be determined with sufficient exactness so that the upper and lower faces 12 and 13 can be formed to correspond thereto, thus giving maximum protection against failure.

Referring now to Figs. 5–8, the numeral 40 indicates an elongated spinal member having a butt end 41 and a semi-ellipsoidal portion 42, the latter having upper and lower supporting faces 45 and 46. Intermediate the butt 41 and ellipsoidal portion 42, the upper and lower faces of the spinal member 40 are provided with a series of angularly disposed slots extending laterally across said faces in a manner similar to slots 14 and 15 of the spring assembly shown in Figs. 1–4.

Between successive slots on the same face of the spinal block, the face is curved to provide a plurality of supporting seats 45a and 45b, and 46a and 46b, respectively. A plurality of flexible leaves 47, 47a and 47b, and 48, 48a and 48b, are inserted in the slots in the upper and lower faces, respectively, in a manner similar to that employed in the first form of my invention.

It will thus be seen (Fig. 7) that when the plural spring assembly built around the spinal member 40 is mounted on a base board 25 and the resilient leaves are partially stressed by cords or other suitable means, that the leaves will overlap each other and form a continuous spring member. As stress is applied to the assembly from above, the leaves will flex until they assume the substantially horizontal position shown in Fig. 8, at which point they will engage their respective seats and be supported thereby. In other words, the resilient leaf 47 will engage the curved seat 45, while leaf 47a will engage seat 45a, and will also overlap and engage leaf 47, and so on. By the construction of my invention, the number of unconnected parts necessary to make up a complete structure is considerably cut down and the flexibility of a spring structure such as a bed is sufficiently localized to prevent depression of the whole structure due to force exerted at one point only.

If desired, the leaves in the plural spring form of my invention may also be provided with flanges or keys similar to the flanges 20 and 21 of the first form illustrated, to increase the stability of the assembly. In arranging a plurality of spring assemblies, they may be disposed so that alternate units face in the opposite direction, or they may all face the same direction. In either case, it is advisable to tie the various spring elements together so as to provide a stable structure. As in the first form shown, the lower leaves 48, 48a, and 48b, may be nailed to the base board 25 or may be secured in place by other suitable means.

It will be observed that an unsupported or springless area exists immediately above and below the butt end 41 unless the end leaf is located quite near the outer edge of the butt, which condition is sometimes undesirable. To remedy this situation when it occurs, supplemental or auxiliary leaves and leaf-supporting blocks may be used as seen in Figs. 5–8, inclusive. A relatively short supporting block 50 having an angular slot on its upper face is cut to rest on the butt 41 and the base portion of leaf 47b, being held in position by any suitable means. A short leaf 51 is placed in the angular slot and extends over the base of leaf 47b, thus filling out what would otherwise be dead space at that point. It will be understood of course that this dead space can also be minimized by reducing the size of the butt 41 or by reinforcing it to allow the insertion of an auxiliary leaf quite near the free end of the butt.

It is apparent that by the structures herein described, I secure a maximum of resiliency with a minimum thickness of spring assembly and that the springs can be used in all types of spring structure without fear of failure.

While the forms of my invention herein illustrated and described in detail are fully capable of attaining the objects and providing the advantages hereinbefore stated, it is to be understood that they are merely illustrative of my invention and that I do not mean to be limited to the forms shown, but intend to include all equivalent forms as defined in the appended claims.

I claim:

1. A spring assembly which includes: a spinal member having a portion of its opposite faces curved longitudinally with an angular slot at one end of each curved face; and flexible leaves mounted in said slots and extending angularly over said curved portions, whereby said leaves can be flexed toward said spinal member.

2. A spring assembly which includes: a spinal member comprising a block having its faces curved for a portion of their length with a slot on each face at the base of the curve and substantially tangential therewith; a flexible leaf in each of said slots extending outwardly and longitudinally of said block; an auxiliary leaf holding block mounted on said spinal member adjacent said slot, said auxiliary member having a curved seat and an angular slot therein; and a flexible leaf in said last named slot and overlying one of said first mentioned leaves.

3. A spring assembly which includes: a spinal member comprising an elongated block having a plurality of curved seats on its opposite faces, separated by angular slots; and a flexible leaf mounted in each of said slots and extending angularly from and longitudinally of said block in overlying relation, the curvature of said seats being substantially that assumed by said leaves when they are substantially fully flexed, said assembly being adapted to be mounted with one set of leaves engaging a base board so that pressure on the opposite leaves causes flexing of all leaves.

4. In a spring assembly, a leaf supporting block having its opposite faces formed as a plurality of curved segments separated by tangential slots, each slot being adapted to receive a flexible leaf, the curvature of said segments being substantially that assumed by their respective leaves when mounted and flexed.

5. In a spring assembly, a leaf-supporting block having its opposite faces formed as a plurality of curved segments separated by tangential slots, each slot being adapted to receive a flexible leaf, whereby said leaves will overlie each other in spaced relationship.

6. A spring assembly which includes: leaf supporting means having its opposite faces formed as a plurality of curved segments separated by tangential slots; and flexible leaves in said slots extending over said curved segments and overlying each other in spaced relationship.

7. A spring assembly which includes: a spinal member having its opposite faces curved for a portion of their length with a slot in each face at the base of the curve and substantially tangential thereto; and a flexible leaf in each of said slots extending outwardly and longitudinally of said spinal member, whereby said leaves will be flexed simultaneously when a load is applied thereto.

EDWARD ROBEY.